(12) United States Patent
Cao et al.

(10) Patent No.: US 6,927,187 B2
(45) Date of Patent: Aug. 9, 2005

(54) SYNTHESIS OF SILICOALUMINOPHOSPHATES

(75) Inventors: Guang Cao, Branchburg, NJ (US); Matu J. Shah, Livingston, NJ (US); John F. Brody, Bound Brook, NJ (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 10/617,852

(22) Filed: Jul. 11, 2003

(65) Prior Publication Data

US 2005/0009691 A1 Jan. 13, 2005

(51) Int. Cl.[7] .............................................. B01J 29/06
(52) U.S. Cl. ...................... 502/214; 502/208; 423/305; 423/306; 423/327.1; 423/DIG. 30
(58) Field of Search ................. 502/208, 214; 423/305, 306, 327.1, DIG. 30

(56) References Cited

U.S. PATENT DOCUMENTS

| | | | | |
|---|---|---|---|---|
| 4,310,440 | A | 1/1982 | Wilson et al. | 252/435 |
| 4,440,871 | A | 4/1984 | Lok et al. | 502/214 |
| 4,801,743 | A | 1/1989 | Baugh et al. | 562/519 |
| 4,861,739 | A | 8/1989 | Pellet et al. | 502/64 |
| 4,898,660 | A | 2/1990 | Wilson et al. | 208/114 |
| 5,096,684 | A | 3/1992 | Guth et al. | 423/306 |
| 5,124,136 | A | 6/1992 | Davis | 423/305 |
| 5,232,683 | A | 8/1993 | Clark et al. | 423/708 |
| 5,370,851 | A | 12/1994 | Wilson | 423/305 |
| 5,514,362 | A | 5/1996 | Miller | 423/702 |
| 5,879,655 | A | 3/1999 | Miller et al. | 423/702 |
| 6,162,415 | A | 12/2000 | Liu et al. | 423/706 |
| 6,620,983 | B1 * | 9/2003 | Cao et al. | 585/640 |
| 6,680,278 | B2 * | 1/2004 | Cao et al. | 502/214 |
| 6,793,901 | B2 * | 9/2004 | Cao et al. | 423/305 |

FOREIGN PATENT DOCUMENTS

| | | | |
|---|---|---|---|
| CN | 1299776 | 12/1999 | C01B/37/08 |
| CN | 1301598 | 12/1999 | B01J/29/85 |
| EP | 0 043 562 | 6/1984 | C01B/25/36 |
| EP | 0 391 774 | 10/1990 | |
| EP | 0 538 958 | 4/1993 | C01B/25/36 |
| EP | 0 993 867 | 4/2000 | B01J/29/85 |
| EP | 1 142 833 | 10/2001 | C01B/37/06 |
| WO | WO 01/25150 | 4/2001 | |
| WO | WO 01/36328 | 5/2001 | |

OTHER PUBLICATIONS

Pluth J.J., et al, "Silicoaluminophosphate with Encapsulated Methylbutylamine Species: Chabazite Structure, Charge Coupling Between Framework and Inferred Ammonium Species, and Severe Molecular Disorder," Journal of Physical Chemistry, American Chemical Society, US, vol. 93, No. 17, 1989, pp. 6516–6520.
Dialog Abstract of EP 391774 "Process for the Synthesis of Type Silicoaluminophosphate Molecular Sieve Precursors, Precursors therefrom and their Application in the Preparation of these Mole" Published Oct. 10, 1990.
"Atlas of Zeolite Framework Types", 5th Edition, p. 96 (2001).
Feng et al., Microporous and Mesoporous Materials, vol. 23, No. 3–4, pp. 221–229 (1998).
Wilson et al., Microporous and Mesoporous Materials, vol. 28, No. 1, pp. 125–137 (1999).
Wilson et al., Studies in Surface Science and Catalysis, vol. 98, pp. 9–10 (1995).
Bu et al., Microporous and Mesoporous Materials, vol. 25, No. 1–3, pp. 109–117, (1998).
Feng et al., Nature (London), vol. 388, pp. 735–741, no date.
Ferey et al., Journal of Solid State Chemistry, vol. 105 (1), pp. 179–190 (1993).
Long et al., Chemical Journal of Chinese Universities, vol. 7(2), pp. 100–104 (1986).
Long et al., Journal of Fudan University (Natural Science) vol. 25(3) pp. 301–308, (1986).
Tian et al., Chemical Journal of Chinese Universities, vol. 22(6), pp. 991–994 (2001).
Tian, et al., "Synthesis, characterization and catalysis of SAPO–56 and MAPSO–56 molecular sieves", Studies in Surface Science and Catalysis, vol. 135, *Zeolites and Mesoporous Materials at the Dawn of the 21st Century*, pp. 891–898 (2001).

* cited by examiner

Primary Examiner—Christina Johnson (57) ABSTRACT

The invention is directed to a method of synthesising silicoaluminophosphate molecular sieves and in particular those of framework type CHA and AEL. The method uses synthesis templates that comprise one or more tertiary dialkylbutylamines, wherein the alkyl groups are not butyl. The use of such templates, especially N,N-dimethylbutylamine, results in SAPO-11 of a desirable platelet morphology.

20 Claims, 3 Drawing Sheets

SYNTHESIS OF SILICOALUMINOPHOSPHATES

FIELD OF INVENTION

This invention relates to the synthesis of silicoaluminophosphate molecular sieves and in particular silicoaluminophosphates of the AEL and CHA framework type. In particular the present invention relates to the synthesis of such silicoaluminophosphate molecular sieves using as synthesis template one or more tertiary dialkylbutylamines.

BACKGROUND OF THE INVENTION

Silicoaluminophosphate molecular sieves exhibit a wide variety of framework types and are useful as catalysts in a variety of reactions. There are a wide variety of SAPO molecular sieves known in the art, of these the more important examples include SAPO-5, SAPO-11, SAPO-18, SAPO-34, SAPO-35, SAPO-41, and SAPO-56. Of particular interest are [Si—Al—P]-AEL (SAPO-11) and [Si—Al—P]-CHA (SAPO-34) both of which are of commercial interest. For the methanol-to-olefins process SAPO molecular sieves having the CHA framework type ("Atlas of Zeolite Framework Types", 2001, 5th Edition, p. 96) and especially SAPO-34 are particularly important catalysts. The CHA framework type has a double six-ring structure in an ABC stacking arrangement. The pore openings of the structure are defined by eight member rings that have a diameter of about 4.0 Å, and cylindrical cages within the structure of approximately 10×6.7 Å. Other SAPO molecular sieves of CHA framework type include SAPO-44, SAPO-47 and ZYT-6. The AEL framework type SAPO-11 has a 1-D, 10 ring structure. It is known that SAPO-11 molecular sieves catalyse hydroisomerization reactions of wax with high selectivity yielding lubricants with high viscosity index and low pore point. SAPO-11 has also been found to be useful as a catalyst in naphtha cracking where it is found to give a high selectivity for propylene.

The synthesis of SAPO molecular sieves is a complicated process. There are a number of variables that need to be controlled in order to optimise the synthesis in terms of purity, yield and quality of the SAPO molecular sieve produced. A particularly important variable is the choice of synthesis template, which usually determines which SAPO framework type is obtained from the synthesis. U.S. Pat. No. 4,310,440 (Wilson et al.) teaches that "not all templating agents suitably employed in the preparation of certain species . . . are suitable for the preparation of all members of the generic class." It is also well known that the same template may induce the formation of different framework types.

In U.S. Pat. No. 4,440,871 (Lok et.al) the synthesis of a wide variety of SAPO materials of various framework types are described with a number of specific examples. Also disclosed are a large number of possible organic templates, with some specific examples. In the specific examples a number of CHA framework type materials are described. SAPO-34 of CHA framework type is prepared utilising tetraethylammonium hydroxide (TEAOH), or isopropylamine, or mixtures of TEAOH and dipropylamine (DPA). This is believed to be the first reported synthesis of a SAPO-34 of CHA framework type. Also disclosed in this patent is a specific example that uses cyclohexylamine in the preparation of SAPO-44, also having the CHA framework type. Although other template materials are described in this reference there are no other templates indicated as being suitable for preparing SAPO's of CHA framework type.

Certain aminoalcohols are also mentioned amongst the list of templates, including; triethanolamine, N-methyldiethanolamine, N-methylethanolamine, N,N-dimethylethanolamine and N,N-diethylethanolamine. Of these materials N,N-diethylethanolamine is shown to produce SAPO-5, which is of AFI framework type. For the other aminoalcohols no indication is provided as to which SAPO or which framework type may be obtained through their use. Also disclosed in this patent is the synthesis of SAPO-11 which is achieved through the use of di-isopropylamine, di-n-propylamine, and tetrabutylammoniumhydroxide, at crystallization temperatures of between 150° C. and 200° C.

Since the synthesis of SAPO-34 was reported in U.S. Pat. No. 4,440,871, tetraethylammonium hydroxide (TEAOH) either alone, or in combination with dipropylamine (DPA), has been the template of choice for preparing SAPO-34. However, there are problems associated with the use of TEAOH and DPA. When used alone, TEAOH affords a limited range of synthesis parameters. For example, under certain conditions TEAOH will also template the synthesis of SAPO-18 which has the AEI framework type. TEAOH is thus relatively intolerant to synthesis condition variations. TEAOH is sometimes combined with DPA. However, DPA has a low boiling point (110° C.) resulting in the need for production plants that can handle high pressures. In certain countries, the use of DPA requires special regulatory authorizations due to its toxicity. Also, DPA is an aggressive template and is often implicated in re-dissolution of the silicoaluminophosphate molecular sieve during its synthesis, resulting in poor quality crystalline product due to surface pitting of the crystals. Although there are problems associated with TEAOH and DPA, no completely satisfactory alternative template materials have been reported yet for the preparation of silicoaluminophosphate molecular sieves with the CHA framework type.

In U.S. Pat. No. 4,440,871, it was reported that SAPO-44 was obtained "as the major phase" using cyclohexylamine as template. In U.S. Pat. No. 6,162,415 (Liu, et.al.), relatively pure CHA SAPO-44 was obtained using the same template but with control of the ratio of template to aluminium component and the ratio of phosphorous component to aluminium component.

In U.S. Pat. No. 4,801,743 (Flannigan, et.al.), SAPO-11 was prepared using diethanolamine or diethanolamine in combination with dipropylamine as organic template at a crystallization temperature of 150° C.

In European Patent Publication No. 0,993,867, it was reported that the use of methylbutylamine resulted in SAPO-47 and the use of cyclohexylamine resulted in impure SAPO-44. Methylbutylamine has an even lower boiling point, at 91° C., than DPA. In U.S. Pat. No. 6,162,415 (Liu, et.al.), relatively pure SAPO-44 was obtained using cyclohexylamine as the template with additional control of the ratio of template to aluminium component and the ratio of phosphorous component to aluminium component.

In U.S. Pat. No. 5,096,684 (Guth et.al.), morpholine and tetraethylammonium hydroxide were found to be effective in the synthesis of SAPO-34 when in the presence of HF. Whilst this is an alternative to TEAOH or TEAOH/DPA mixtures, it requires the use of HF. This patent also discloses the preparation of SAPO-11 using di-n-propylamine as template in combination with HF at a crystallization temperature of 170° C.

When attempts have been made to utilise other types of template compounds such as aminoalcohols, silicoaluminophosphates of framework type other than CHA have been obtained. In U.S. Pat. No. 4,440,871 (Lok, et al) it was disclosed that the use of diethylethanolamine produced SAPO-5 (AFI). In U.S. Pat. No. 4,861,739 (Pellet, et al.) it was reported that the use of diethylethanolamine produced CHA SAPO-47. In U.S. Pat. No. 5,096,684 (Guth et.al.), N,N-diethylethanolamine was found, in the presence of HF, to produce SAPO-5, which is of AFI framework type. In U.S. Pat. No. 4,310,440 (Wilson et.al), triethanolamine, N,N-dimethylethanolamine, N,N-diethylethanolamine, N-methyldiethanolamine, and N-methylethanolamine, were all used to prepare AlPO4-5, aluminophosphates of AFI framework type. In European Patent Publication No. 0,993,867, it was reported that diethanolamine produced SAPO-34 and SAPO-5 with different levels of template in the synthesis mixture. To-date all attempts to reproduce SAPO-34 using this template have failed. In U.S. Pat. No. 4,310,440 (Wilson et al.) it was reported that N-methylethanolamine resulted in the formation of AlPO4-21 of AWO framework type.

In the art various attempts have been made to synthesize AlPO4 or SAPO molecular sieves using templates based on the alkylene diamine or polyamine structures such as for example those based on for example ethylenediamine, 1,3-propanediamine, and 1,6-hexanediamine. In European Patent Publication No. 0,043,562, it was reported that the use of N,N,N',N'-tetramethyl ethylenediamine as organic template resulted in the formation of AlPO4-21. In European Patent Publication No. 0,538,958, it was reported that the use of N,N,N',N'-tetramethyl ethylenediamine as organic template resulted in the formation of an AlPO4 referred to as SCS-24. In European Patent Publication No. 1,142,833, it was reported that the use of N,N,N',N'-tetramethyl-1,6-hexanediamine as organic template resulted in the formation of MeAPSO-56 and SAPO-56. In U.S. Pat. No. 4,898,660 (Wilson et.al), ethylenediamine was used to prepare AlPO4-12. N,N,N',N'-tetramethyl-propane-1,3-diamine and N,N,N',N'-tetramethyl ethylenediamine were reported to produce AlPO4-21. In U.S. Pat. No. 5,370,851 (Wilson), it was reported that the use of N,N,N',N'-tetramethyl-1,6-hexanediamine as organic template resulted in the formation of SAPO-56. In U.S. Pat. No. 5,232,683 (Clark et.al.), it was reported that the use of 1,8-diaminooctane, 1,10-diaminodecane and 1,12-diaminododecane as organic templates resulted in the formation SCS-22 type aluminophosphate molecular sieves. Wilson, et al., have reported the use of N,N,N',N'-tetramethyl-1,6-hexanediamine as organic template resulted in the formation of AlPO-17, SAPO-17, MAPSO-34 and SAPO-56 (Microporous and Mesoporous Materials, 28(1), 125–137, 1999 and Studies in Surface Science and Catalysis (1995) 98, (Zeolite Science 1994: Recent Progress and Discussions), 9–10). Bu, et.al., have reported the use of, N,N,N',N'-tetramethylethylenediamine and 1,3-diaminopropane as structure directing agents for the formation of cobalt aluminophosphates UCSB-4 and UCSB-5 (Microporous and Mesoporous Materials, 25(1–3), 109–117,1998).

Feng, et.al., have reported that a variety of cobalt phosphates having zeolite like structures could be prepared using a variety of alkylenediamines as structure directing agents (Nature (London), 388(6644), 735–741, 1997). In a latter work it was reported that cobalt aluminophosphates of CHA framework type could be prepared using N,N,N',N'-tetramethyl-1,6-hexanediamine as organic template and a zinc aluminophosphate of CHA framework type could be prepared using N,N,N',N'-tetramethyl-1,3-butanediamine as organic template or dibutylamine (Microporous and Mesoporous Materials, 23, 221–229,1998). Ferey, et.al., have reported that the use of N,N,N',N'-tetramethyl-1,6-hexanediamine as organic template in the presence of ammonium fluoride produced AlPO-CJ2 (Journal of Solid State Chemistry 105(1), 179–90, 1993). Long, et.al., have reported that the use of N,N,N',N'-tetramethyl ethylenediamine as organic template resulted in the formation of an AlPO4-21 and an AlPO4 molecular sieve named CFAP-2 (Chemical Journal of Chinese Universities 7(2), 100-4, 1986 and Journal of Fudan University (Natural Science) 25(3), 301-8, 1986). Tian, et.al., have reported that the use of N,N,N',N'-tetramethyl-1,6-hexanediamine as organic template resulted in the formation of SAPO-56 and MAPSO-56 molecular sieves (Studies in Surface Science and Catalysis (2001), 135 (Zeolites and Mesoporous Materials at the Dawn of the 21st Century), 891–898 and Chemical Journal of Chinese Universities 22(6), 991–994, 2001).

In Chinese Patent No. 1,299,776, it was reported that the use of N,N,N',N'-tetramethyl-1,6-hexanediamine as organic template resulted in the formation of SAPO-56 molecular sieve. In Chinese Patent No. 1,301,598, it was reported that the use of N,N,N',N'-tetramethyl-1,6-hexanediamine as organic template resulted in the formation of SAPO-56, and various MeAPSO-56 molecular sieves. In U.S. Pat. Nos. 5,232,683, 5,879,655 and 5,514,362 (Miller), it was reported that SAPO-11 could be prepared using DPA as organic template at crystallization temperatures of >180° C. and typically between 190° C. and 200° C.

As can bee seen from the disclosures described herein, there have been a number of attempts to utilise alternative synthesis templates for the synthesis of silicoaluminophosphates and in particular silicoaluminophosphates of the AEL and CHA framework types. Many of these synthetic methods have limitations and it is desirable therefore to find new synthesis templates that are specific for the synthesis of silicoaluminophosphate molecular sieves of the AEL and/or CHA framework types. In addition there is a need in relation to [Si—Al—P]-AEL (SAPO-11) to find new templating systems which afford crystallization at low temperatures.

A further property of silicoaluminophosphates which is of interest is the morphology of the molecular sieve particles recovered from the synthetic process. In the case of SAPO-11 a highly desirable morphology is a platelet morphology in which the dimension of the crystal plane parallel to the direction of the D-1 channel is relatively thin. Typically, such morphologies are relatively difficult to achieve and often require the use of surfactants or other crystal modifiers. Alternative organic templates which enable such morphologies to be obtained with ease and ideally without the need to use additional surfactants and/or crystal modifiers are highly desirable.

SUMMARY OF THE INVENTION

The present invention provides a process for preparing a crystalline silicoaluminophosphate molecular sieve, which process comprises forming a reaction mixture comprising a source of alumina, a source of phosphate, a source of silica and at least one organic template which comprises one or more tertiary dialkylbutylamines, wherein the alkyl groups are not butyl, inducing crystallization of crystalline molecular sieve, and recovering the crystalline molecular sieve.

In one embodiment the process of the present invention is for the manufacture of a silicoaluminophosphate molecular sieve of framework type AEL, wherein the molar ratio of organic template to $Al_2O_3$ in the synthesis mixture is less than 3.

In a further embodiment the process of the present invention is for the manufacture of a silicoaluminophosphate molecular sieve of framework typo CHA, wherein the molar ratio of organic template to $Al_2O_3$ is 2 or greater, more preferably 3 or greater.

In a preferred embodiment the $P_2O_5/Al_2O_3$ ratio in the synthesis mixture is within the range 0.8 to 1.3.

The process of the present invention results in new silicoaluminophosphate compositions with the CHA framework type that, as synthesized, have unique X-Ray diffraction patterns.

The process of the present invention results in new silicoaluminophosphate compositions with the AEL framework type that, as synthesized, have unique X-Ray diffraction patterns. The AEL framework type materials obtained from the process of the present invention have a highly desirable platelet morphology.

In one embodiment of the present invention there is provided a silicoaluminophosphate molecular sieve, substantially of CHA framework type, comprising within its intra-crystalline structure at least one template which contains one or more tertiary dialkylbutylamines, wherein the alkyl groups are not butyl. Preferably, the tertiary dialkylbutylamine is dimethylbutylamine.

In a further embodiment of the present invention there is provided a silicoaluminophosphate molecular sieve, substantially of AEL framework type, comprising within its intra-crystalline structure at least one template which contains one or more tertiary dialkylbutylamines, wherein the alkyl groups are not butyl. Preferable, the tertiary dialkylbutylamine is dimethylbutylamine.

In another embodiment the present invention provides a method for the manufacture of a formulated catalyst composition, which method comprises forming a mixture comprising at least one silicoaluminophosphate molecular sieve of the present invention, with at least one formulating agent, to form a catalyst composition.

In a further embodiment the present invention provides for a formulated molecular sieve composition comprising at least one silicoaluminophosphate molecular sieve of the present invention in admixture with at least one formulating agent.

In yet a further embodiment the present invention provides for the use of a template comprising at least one compound which contains one or more tertiary dialkylbutylamines, wherein the alkyl groups are not butyl, in the synthesis of silicoaluminophosphates of the AEL or CHA framework type.

In another embodiment the present invention provides a method for the manufacture of a formulated catalyst composition, which method comprises forming a mixture comprising at least one silicoaluminophosphate molecular sieve according to the present invention or as obtained from a process according to the present invention for the manufacture of silicoaluminophosphates, with at least one formulating agent, to form a catalyst composition.

In yet a further embodiment the present invention provides for a formulated molecular sieve composition comprising at least one silicoaluminophosphate molecular sieve according to the present invention or as obtained from a process according to the present invention for the manufacture of silicoaluminophosphates, in admixture with at least one formulating agent.

BRIEF DESCRIPTION OF THE DRAWINGS

The present invention will be better understood by reference to the Detailed Description of the Invention when taken together with the attached drawings wherein.

DETAILED DESCRIPTION OF THE INVENTION

Introduction

The invention is primarily directed toward a method for synthesising silicoaluminophosphates and in particular silicoaluminophosphates of the AEL or CHA framework type. In particular it has been found that a specific group of organic amines are effective synthesis templates for both these framework types. Through the use of these templates not only is it possible to prepare silicoaluminophosphates of AEL or CHA framework type, when this was not expected, but it is also possible to prepare silicoaluminophosphates of CHA framework type without also introducing significant impurities of other framework types and also to produce silicoaluminophosphates of AEL framework type with the highly desirable platelet morphology. It has been found that if templates are used, which contain one or more tertiary dialkylbutylamines, wherein the alkyl groups are not butyl, then SAPOs of AEL or CHA framework type and of substantially high purity is obtained.

Silicoaluminophosphates

The SAPO molecular sieves of the present invention, may be represented by the empirical formula, on an anhydrous basis:

$$mR:(Si_xAl_yP_z)O_2$$

wherein R represents at least one templating agent comprising one or more tertiary dialkylbutylamines, wherein the alkyl groups are not butyl; m is the number of moles of R per mole of $(Si_xAl_yP_z)O_2$ and m has a value from 0.02 to 0.3333, preferably from 0.04 to 0.25, and most preferably from 0.05 to 0.20; x, y, and z respectively represent the mole fraction of Si, Al and P as tetrahedral oxides.

In one embodiment, m is greater than or equal to 0.02, and x, y and z are greater than or equal to 0.01. In another embodiment, m is in the range of from greater than 0.01 to about 1, x is in the range of from greater than 0 to about 0.31, y is in the range of from 0.25 to 1.0, and z is in the range of from 0.25 to 0.9; more preferably m is in the range of from 0.01 to 0.25, x is in the range of from 0.01 to 0.2, y is in the range of from 0.4 to 1.0, and z is in the range of from 0.3 to 0.9.

When these materials are calcined the organic template is removed and the resulting silicoaluminophosphates have the AEL or CHA framework type and are of substantially high purity in terms of their framework types.

Molecular Sieve Synthesis

Generally, silicoaluminophosphate molecular sieves are synthesized by the hydrothermal crystallization of one or more of a source of aluminum, a source of phosphorous, a source of silicon, and a templating agent. Typically, a combination of sources of silicon, aluminum and phosphorous, optionally with one or more templating agents and/or one or more metal containing compounds are placed in a sealed pressure vessel, optionally lined with an inert plastic such as polytetrafluoroethylene, and heated, under a crystallization pressure and temperature, until a crystalline material is formed, and then recovered by filtration, centrifugation and/or decanting.

In a typical synthesis of the molecular sieve, the phosphorous-, aluminum-, and/or silicon-containing components are mixed, preferably while stirring and/or agitation and/or seeding with a crystalline material, optionally with an alkali metal, in a solvent such as water, and one or more templating agents, to form a synthesis mixture that is then heated under crystallization conditions of pressure and temperature as described in U.S. Pat. No. 4,440,871 which is fully incorporated by reference.

In the process of the present invention, the template is used in an amount such that the ratio of template to alumina in the reaction mixture is within the range of from 1.0:1.0 to 5.0:1.0, preferably from 1.0:1.0 to 4.0:1.0.

The templates used in the process of the present invention contain one or more tertiary dialkylbutylamines, wherein the alkyl groups are not butyl and preferably have the following general structure of formula (I):

$$(R)(R')N\text{---}(C_4H_9) \qquad (I)$$

wherein R and R' are not butyl, they may be the same or different groups and may be substituted or un-substituted aliphatic or cycloaliphatic groups. R and R' may be linear or branched alkyl groups, or linear or branched alcohol groups, or linear or branched amine-containing groups. Preferably, R and R' contain an alkyl group of from 1 to 3 or 5 to 12 carbon atoms, more preferably 1 to 3 or 5 or 6 carbon atoms, even more preferably 1 to 3 or 5 carbon atoms; and most preferably 1 to 3 carbon atoms.

In a preferred embodiment R and R' may be one or more of the following alkyl moieties: methyl, ethyl, n-propyl, iso-propyl, n-pentyl, iso-pentyl, n-hexyl, iso-hexyl, heptyl, iso-heptyl, n-octyl, iso-octyl, n-decyl, iso-decyl, n-undecyl, iso-undecyl, n-dodecyl and iso-dodecyl. The preferred alkyl moieties are methyl, ethyl and propyl, with methyl being the most preferred.

The single $C_4H_9$ group in formula (I) may be n-butyl or iso-butyl or mixtures thereof, preferably n-butyl.

The sources of aluminum, phosphorus and silicon suitable for use in the synthesis of molecular sieves according to the present invention are typically those known in the art or as described in the literature for the production of the SAPO concerned. The aluminum source may be, for example, an aluminum oxide (alumina), optionally hydrated, an aluminum salt, especially a phosphate, an aluminate, or a mixture thereof. A preferred source is a hydrated alumina, most preferably pseudoboehmite, which contains about 75% $Al_2O_3$ and 25% $H_2O$ by weight. Advantageously, the source of phosphorus is a phosphoric acid, especially orthophosphoric acid, but other sources, for example, organic phosphates, e.g., triethyl phosphate, and aluminophosphates may be used. Advantageously, the source of silicon is silica, for example colloidal silica, fumed silica, or an organic silicon source, e.g., a tetraalkyl orthosilicate, especially tetraethyl orthosilicate.

In the process of the present invention selection of the correct molar ratio of organic template to $Al_2O_3$ is important in determining which silicoaluminophosphate framework type is crystallized. Accordingly if the desired silicoaluminophosphate is of framework type AEL then the molar ratio of organic template to $Al_2O_3$ should be less than 3 and preferably is 2.5 or less, more preferably 2.0 or less. If the desired silicoaluminophosphate is of framework type CHA then the molar ratio of organic template to $Al_2O_3$ should be 2 or more, more preferably 3 or more. In a preferred embodiment the $P_2O_5/Al_2O_3$ ratio in the synthesis mixture is within the range 0.8 to 1.3.

When the process of the present invention is adapted to produce silicoaluminophosphates of framework type AEL it has been found that the resultant material isolated from the synthesis has a highly desirable morphology. The product is a particulate material in the form of 2 to 5 μm "dimpled" spheres made up of crystallites of a thin platelet morphology with a thickness in the plane parallel to the D1 channel of 200 nm or less, preferably 150 nm or less, more preferably 100 nm or less and most preferably approximately 50 nm or less.

Method for Making Molecular Sieve Catalyst Compositions

The silicoaluminophosphate molecular sieves of the present invention may be combined with one or more formulating agents, to form a molecular sieve catalyst composition or a formulated molecular sieve catalyst composition. The formulating agents may be one or more materials selected from the group consisting of binding agents, matrix or filler materials, catalytically active materials and mixtures thereof, . This formulated molecular sieve catalyst composition is formed into useful shape and sized particles by well-known techniques such as spray drying, pelletizing, extrusion, and the like.

There are many different binders that are useful in forming the molecular sieve catalyst composition. Non-limiting examples of binders that are useful alone or in combination include various types of hydrated alumina, silicas, and/or other inorganic oxide sol. One preferred alumina containing sol is aluminium chlorohydrol. The inorganic oxide sol acts like glue binding the synthesized molecular sieves and other materials such as the matrix together, particularly after thermal treatment. Upon heating, the inorganic oxide sol, preferably having a low viscosity, is converted into an inorganic oxide matrix component. For example, an alumina sol will convert to an aluminium oxide matrix following heat treatment.

Aluminium chlorohydrol, a hydroxylated aluminium based sol containing a chloride counter ion, has the general formula of $Al_mO_n(OH)_oCl_p.x(H_2O)$ wherein m is 1 to 20, n is 1 to 8, o is 5to40, p is 2to 15, and x is 0 to 30. In one embodiment, the binder is $Al_{13}O_4(OH)_{24}Cl_7.12(H_2O)$ as is described in G. M. Wolterman, et al., Stud. Surf. Sci. and Catal., 76, pages 105–144(1993), which is herein incorporated by reference. In another embodiment, one or more binders are combined with one or more other non-limiting examples of alumina materials such as aluminium oxyhydroxide, γ-alumina, boclmiite, diaspore, and transitional aluminas such as α-alumina, β-alumina, γ-alumina, δ-alumina, ε-alumina, κ-alumina, and ρ-alumina, aluminium trihydroxide, such as gibbsite, bayerite, nordstrandite, doyelite, and mixtures thereof.

In another embodiment, the binders are alumina sols, predominantly comprising aluminium oxide, optionally including some silicon. In yet another embodiment, the binders are peptised alumina made by treating alumina hydrates such as pseudobohemite, with an acid, preferably an acid that does not contain a halogen, to prepare sols or aluminium ion solutions. Non-limiting examples of commercially available colloidal alumina sols include Nalco 8676 available from Nalco Chemical Co., Naperville, Ill., and Nyacol available from The PQ Corporation, Valley Forge, Pa.

The metalloaluminophosphate molecular sieve may be combined with one or more matrix material(s). Matrix materials are typically effective in reducing overall catalyst cost, act as thermal sinks assisting in shielding heat from the catalyst composition for example during regeneration, densifying the catalyst composition, increasing catalyst strength such as crush strength and attrition resistance, and to control the rate of conversion in a particular process.

Non-limiting examples of matrix materials include one or more of the following: rare earth metals, metal oxides including titania, zirconia, magnesia, thoria, beryllia, quartz, silica or sols, and mixtures thereof, for example silica-magnesia, silica-zirconia, silica-titania, silica-alumina and silica-alumina-thoria. In one embodiment, matrix materials are natural clays such as those from the families of montmorillonite and kaolin. These natural clays include sabbentonites and those kaolins known as, for example, Dixie, McNamee, Georgia and Florida clays. Non-limiting examples of other matrix materials include: haloysite, kaolinite, dickite, nacrite, or anauxite. In one embodiment, the matrix material, preferably any of the clays, are subjected to well known modification processes such as calcination and/or acid treatment and/or chemical treatment.

In one embodiment, the binder, the molecular sieve and the matrix material are combined in the presence of a liquid to form a molecular sieve catalyst composition, where the amount of binder is from about 2% by weight to about 30% by weight, preferably from about 5% by weight to about 20% by weight, and more preferably from about 7% by weight to about 15% by weight, based on the total weight of the binder, the molecular sieve and matrix material, excluding the liquid (after calcination).

In another embodiment, the weight ratio of the binder to the matrix material used in the formation of the molecular sieve catalyst composition is from 0:1 to 1:15, preferably 1:15 to 1:5, more preferably 1:10 to 1:4, and most preferably 1:6 to 1:5. It has been found that a higher sieve content, lower matrix content, increases the molecular sieve catalyst composition performance, however, lower sieve content, higher matrix material, improves the attrition resistance of the composition.

Upon combining the molecular sieve and the matrix material, optionally with a binder, in a liquid to form a slurry, mixing, preferably rigorous mixing is needed to produce a substantially homogeneous mixture containing the molecular sieve. Non-limiting examples of suitable liquids include one or a combination of water, alcohol, ketones, aldehydes, and/or esters. The most preferred liquid is water. In one embodiment, the slurry is colloid-milled for a period of time sufficient to produce the desired slurry texture, sub-particle size, and/or sub-particle size distribution.

The molecular sieve and matrix material, and the optional binder, may be in the same or different liquid, and may be combined in any order, together, simultaneously, sequentially, or a combination thereof. In the preferred embodiment, the same liquid, preferably water is used. The molecular sieve, matrix material, and optional binder, are combined in a liquid as solids, substantially dry or in a dried form, or as slurries, together or separately. If solids are added together as dry or substantially dried solids, it is preferable to add a limited and/or controlled amount of liquid.

In one embodiment, the slurry of the molecular sieve, binder and matrix materials is mixed or milled to achieve a sufficiently uniform slurry of sub-particles of the molecular sieve catalyst composition that is then fed to a forming unit that produces the molecular sieve catalyst composition. In a preferred embodiment, the forming unit is spray dryer. Typically, the forming unit is maintained at a temperature sufficient to remove most of the liquid from the slurry, and from the resulting molecular sieve catalyst composition. The resulting catalyst composition when formed in this way takes the form of microspheres.

When a spray drier is used as the forming unit, typically, the slurry of the molecular sieve and matrix material, and optionally a binder, is co-fed to the spray drying volume with a drying gas with an average inlet temperature ranging from 200° C. to 550° C., and a combined outlet temperature ranging from 100° C. to about 225° C. In an embodiment, the average diameter of the spray dried formed catalyst composition is from about 40 $\mu$m to about 300 $\mu$m, preferably from about 50 $\mu$m to about 250 $\mu$m, more preferably from about 50 $\mu$m to about 200 $\mu$m, and most preferably from about 65 $\mu$m to about 90 $\mu$m.

During spray drying, the slurry is passed through a nozzle distributing the slurry into small droplets, resembling an aerosol spray into a drying chamber. Atomization is achieved by forcing the slurry through a single nozzle or multiple nozzles with a pressure drop in the range of from 100 psia to 1000 psia (690 kPaa to 6895 kPaa). In another embodiment, the slurry is co-fed through a single nozzle or multiple nozzles along with an atomisation fluid such as air, steam, flue gas, or any other suitable gas.

In yet another embodiment, the slurry described above is directed to the perimeter of a spinning wheel that distributes the slurry into small droplets, the size of which is controlled by many factors including slurry viscosity, surface tension, flow rate, pressure, and temperature of the slurry, the shape and dimension of the nozzle(s), or the spinning rate of the wheel. These droplets are then dried in a co-current or counter-current flow of air passing through a spray drier to form a substantially dried or dried molecular sieve catalyst composition, more specifically a molecular sieve in powder form.

Generally, the size of the powder is controlled to some extent by the solids content of the slurry. However, control of the size of the catalyst composition and its spherical characteristics are controllable by varying the slurry feed properties and conditions of atomisation.

In another embodiment, the formulated molecular sieve catalyst composition contains from about 1% to about 99%, more preferably from about 5% to about 90%, and most preferably from about 10% to about 80%, by weight of the molecular sieve based on the total weight of the molecular sieve catalyst composition.

In another embodiment, the weight percent of binder in or on the spray dried molecular sieve catalyst composition based on the total weight of the binder, molecular sieve, and matrix material is from about 2% by weight to about 30% by weight, preferably from about 5% by weight to about 20% by weight, and more preferably from about 7% by weight to about 15% by weight.

Once the molecular sieve catalyst composition is formed in a substantially dry or dried state, to further harden and/or activate the formed catalyst composition, a heat treatment such as calcination, at an elevated temperature is usually performed. A conventional calcination environment is air that typically includes a small amount of water vapour. Typical calcination temperatures are in the range from about 400° C. to about 1,000° C., preferably from about 500° C. to about 800° C., and most preferably from about 550° C. to about 700° C., preferably in a calcination environment such as air, nitrogen, helium, flue gas (combustion product lean in oxygen), or any combination thereof.

In one embodiment, calcination of the formulated molecular sieve catalyst composition is carried out in any number of well known devices including rotary calciners, fluid bed calciners, batch ovens, and the like. Calcination time is typically dependent on the degree of hardening of the molecular sieve catalyst composition and the temperature.

In a preferred embodiment, the molecular sieve catalyst composition is heated in nitrogen at a temperature of from about 600° C. to about 700° C. Heating is carried out for a period of time typically from 30 minutes to 15 hours, preferably from 1 hour to about 10 hours, more preferably from about 1 hour to about 5 hours, and most preferably from about 2 hours to about 4 hours.

In addition to the metalloaluminophosphate molecular sieve, the catalyst compositions of the present invention may comprise one or several other catalytically active materials. In one embodiment, one or several metalloaluminophosphate molecular sieves are combined with one more of the following non-limiting examples of catalytically active molecular sieves described in the following: Beta (U.S. Pat. No. 3,308,069), ZSM-5 (U.S. Pat. Nos. 3,702,886, 4,797,267 and 5,783,321), ZSM-11 (U.S. Pat. No. 3,709,979), ZSM-12 (U.S. Pat. No. 3,832,449), ZSM-12 and ZSM-38 (U.S. Pat. No. 3,948,758), ZSM-22 (U.S. Pat. No. 5,336,478), ZSM-23 (U.S. Pat. No. 4,076,842), ZSM-34 (U.S. Pat. No. 4,086,186), ZSM-35 (U.S. Pat. No. 4,016,245, ZSM-48 (U.S. Pat. No. 4,397,827), ZSM-58 (U.S. Pat. No. 4,698,217), MCM-1 (U.S. Pat. No. 4,639,358), MCM-2 (U.S. Pat. No. 4,673,559), MCM-3 (U.S. Pat. No. 4,632,811), MCM-4 (U.S. Pat. No. 4,664,897), MCM-5 (U.S. Pat. No. 4,639,357), MCM-9 (U.S. Pat. No. 4,880,611), MCM-10 (U.S. Pat. No. 4,623,527)MCM-14 (U.S. Pat. No. 4,619,818), MCM-22 (U.S. Pat. No. 4,954,325), MCM-41 (U.S. Pat. No. 5,098,684), M-41S (U.S. Pat. No. 5,102,643), MCM-48 (U.S. Pat. No. 5,198,203), MCM-49 (U.S. Pat. No. 5,236,575), MCM-56 (U.S. Pat. No. 5,362,697), AlPO4-11 (U.S. Pat. No. 4,310,440), titanium aluminosilicates (TASO), TASO-45 (EP-A-0 229,-295), boron silicates (U.S. Pat. No. 4,254,297), titanium aluminophosphates (TAPO) (U.S. Pat. No. 4,500,651), mixtures of ZSM-5 and ZSM-1 (U.S. Pat. No. 4,229,424), ECR-18 (U.S. Pat. No. 5,278,345).

In another embodiment, the metalloaluminophosphate may be bound to another molecular sieve, as disclosed for example in the following: SAPO-34 bound AlPO4-5 (U.S. Pat. No. 5,972,203), PCT WO 98/57743 published Dec. 23, 1988 (molecular sieve and Fischer-Tropsch), U.S. Pat. No. 6,300,535 (MFI-bound zeolites), and mesoporous molecular sieves (U.S. Pat. Nos. 6,284,696, 5,098,684, 5,102,643 and 5,108,725), which are all herein fully incorporated by reference. Binder may no longer be necessary in such systems.

In a further embodiment, the metalloaluminophosphate molecular sieve may be combined with a metal catalyst, for example as a Fischer-Tropsch catalyst.

Process for Using the Molecular Sieve Catalyst Compositions

The molecular sieve catalysts and compositions of the present invention are useful in a variety of processes including: cracking, hydrocracking, isomerization, polymerisation, reforming, hydrogenation, dehydrogenation, dewaxing, hydrodewaxing, absorption, alkylation, transalkylation, dealkylation, hydrodecylization, disproportionation, oligomerization, dehydrocyclization and combinations thereof.

When the silicoaluminophosphates are of CHA framework type the preferred processes of the present invention include a process directed to the conversion of a feedstock comprising one or more oxygenates to one or more olefin(s) and a process directed to the conversion of ammonia and one or more oxygenates to alkyl amines and in particular methylamines.

In a preferred embodiment of the process of the invention, the feedstock contains one or more oxygenates, more specifically, one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof.

In the most preferred embodiment, the feedstock is selected from one or more of methanol, ethanol, dimethyl ether, diethyl ether or a combination thereof, more preferably methanol and dimethyl ether, and most preferably methanol.

In the most preferred embodiment, the feedstock, preferably of one or more oxygenates, is converted in the presence of a molecular sieve catalyst composition into olefin(s) having 2 to 6 carbons atoms, preferably 2 to 4 carbon atoms. Most preferably, the olefin(s), alone or combination, are converted from a feedstock containing an oxygenate, preferably an alcohol, most preferably methanol, to the preferred olefin(s) ethylene and/or propylene.

The most preferred process is generally referred to as gas-to-olefins (GTO) or alternatively, methanol-to-olefins (MTO). In a MTO process, typically an oxygenated feedstock, most preferably a methanol containing feedstock, is converted in the presence of a molecular sieve catalyst composition into one or more olefin(s), preferably and predominantly, ethylene and/or propylene, often referred to as light olefin(s).

In one embodiment of the process for conversion of a feedstock, preferably a feedstock containing one or more oxygenates, the amount of olefin(s) produced based on the total weight of hydrocarbon produced is greater than 50 weight percent, preferably greater than 60 weight percent, more preferably greater than 70 weight percent.

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent, water, is used either in a liquid or a vapour form, or a combination thereof. The diluent is either added directly to a feedstock entering into a reactor or added directly into a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In one embodiment, other hydrocarbons are added to a feedstock either directly or indirectly, and include olefin(s), paraffin(s), aromatic(s) (see for example U.S. Pat. No. 4,677,242, addition of aromatics) or mixtures thereof, preferably propylene, butylene, pentylene, and other hydrocarbons having 4 or more carbon atoms, or mixtures thereof.

The process for converting a feedstock, especially a feedstock containing one or more oxygenates, in the presence of a molecular sieve catalyst composition of the invention, is carried out in a reaction process in a reactor, where the process is a fixed bed process, a fluidised bed process (includes a turbulent bed process), preferably a continuous fluidised bed process, and most preferably a continuous high velocity fluidised bed process.

The reaction processes can take place in a variety of catalytic reactors such as hybrid reactors that have a dense bed or fixed bed reaction zones and/or fast fluidised bed reaction zones coupled together, circulating fluidised bed reactors, riser reactors, and the like. Suitable conventional reactor types are described in for example U.S. Pat. No. 4,076,796, U.S. Pat. No. 6,287,522 (dual riser), and Fluidization Engineering, D. Kunii and O. Levenspiel, Robert E. Krieger Publishing Company, New York, N.Y. 1977, which are all herein fully incorporated by reference.

The preferred reactor type are riser reactors generally described in Riser Reactor, Fluidization and Fluid-Particle Systems, pages 48 to 59, F. A. Zenz and D. F. Othmer, Reinhold Publishing Corporation, New York, 1960, and U.S. Pat. No. 6,166,282 (fast-fluidised bed reactor), and U.S. patent application Ser. No. 09/564,613 filed May 4, 2000 (multiple riser reactor), which are all herein fully incorporated by reference.

In the preferred embodiment, a fluidised bed process or high velocity fluidised bed process includes a reactor system, a regeneration system and a recovery system.

The reactor system preferably is a fluid bed reactor system having a first reaction zone within one or more riser reactor(s) and a second reaction zone within at least one disengaging vessel, preferably comprising one or more cyclones. In one embodiment, the one or more riser reactor(s) and disengaging vessel is contained within a single reactor vessel. Fresh feedstock, preferably containing one or more oxygenates, optionally with one or more diluent(s), is fed to the one or more riser reactor(s) in which a molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen.

In an embodiment, the amount of liquid feedstock fed separately or jointly with a vapour feedstock, to a reactor system is in the range of from 0.1 weight percent to about 85 weight percent, preferably from about 1 weight percent to about 75 weight percent, more preferably from about 5 weight percent to about 65 weight percent based on the total weight of the feedstock including any diluent contained therein. The liquid and vapour feedstocks are preferably the same composition, or contain varying proportions of the same or different feedstock with the same or different diluent.

The feedstock entering the reactor system is preferably converted, partially or fully, in the first reactor zone into a gaseous effluent that enters the disengaging vessel along with a coked molecular sieve catalyst composition. In the preferred embodiment, cyclone(s) within the disengaging vessel are designed to separate the molecular sieve catalyst composition, preferably a coked molecular sieve catalyst composition, from the gaseous effluent containing one or more olefin(s) within the disengaging zone. Cyclones are preferred, however, gravity effects within the disengaging vessel will also separate the catalyst compositions from the gaseous effluent. Other methods for separating the catalyst compositions from the gaseous effluent include the use of plates, caps, elbows, and the like.

In one embodiment of the disengaging system, the disengaging system includes a disengaging vessel; typically a lower portion of the disengaging vessel is a stripping zone. In the stripping zone the coked molecular sieve catalyst composition is contacted with a gas, preferably one or a combination of steam, methane, carbon dioxide, carbon monoxide, hydrogen, or an inert gas such as argon, preferably steam, to recover adsorbed hydrocarbons from the coked molecular sieve catalyst composition that is then introduced to the regeneration system. In another embodiment, the stripping zone is in a separate vessel from the disengaging vessel and the gas is passed at a gas hourly superficial velocity (GHSV) of from 1 $hr^{-1}$ to about 20,000 $hr^{-1}$ based on the volume of gas to volume of coked molecular sieve catalyst composition, preferably at an elevated temperature from 250° C. to about 750° C., preferably from about 350° C. to 650° C., over the coked molecular sieve catalyst composition.

The conversion temperature employed in the conversion process, specifically within the reactor system, is in the range of from about 200° C. to about 1000° C., preferably from about 250° C. to about 800° C., more preferably from about 250° C. to about 750° C., yet more preferably from about 300° C. to about 650° C., yet even more preferably from about 350° C. to about 600° C. most preferably from about 350° C. to about 550° C.

The conversion pressure employed in the conversion process, specifically within the reactor system, varies over a wide range including autogenous pressure. The conversion pressure is based on the partial pressure of the feedstock exclusive of any diluent therein. Typically the conversion pressure employed in the process is in the range of from about 0.1 kPaa to about 5 MPaa, preferably from about 5 kPaa to about 1 MPaa, and most preferably from about 20 kPaa to about 500 kPaa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone. The WHSV is maintained at a level sufficient to keep the catalyst composition in a fluidised state within a reactor.

Typically, the WHSV ranges from about 1 $hr^{-1}$ to about 5000 $hr^{-1}$, preferably from about 2 $hr^{-1}$ to about 3000 $hr^{-1}$, more preferably from about 5 $hr^{-1}$ to about 1500 $hr^{-1}$, and most preferably from about 10 $hr^{-1}$ to about 1000 $hr^{-1}$. In one preferred embodiment, the WHSV is greater than 20 $hr^{-1}$; preferably the WHSV for conversion of a feedstock containing methanol and dimethyl ether is in the range of from about 20 $hr^{-1}$ to about 300 $hr^{-1}$.

The superficial gas velocity (SGV) of the feedstock including diluent and reaction products within the reactor system is preferably sufficient to fluidise the molecular sieve catalyst composition within a reaction zone in the reactor. The SGV in the process, particularly within the reactor system, more particularly within the riser reactor(s), is at least 0.1 meter per second (m/sec), preferably greater than 0.5 m/sec, more preferably greater than 1 m/sec, even more preferably greater than 2 m/sec, yet even more preferably greater than 3 m/sec, and most preferably greater than 4 m/sec. See for example U.S. patent application Ser. No. 09/708,753 filed Nov. 8, 2000, which is herein incorporated by reference.

In one preferred embodiment of the process for converting an oxygenate to olefin(s) using a silicoaluminophosphate molecular sieve catalyst composition, the process is operated at a WHSV of at least 20 hr$^{-1}$ and a Temperature Corrected Normalized Methane Selectivity (TCNMS) of loss than 0.016, preferably less than or equal to 0.01. See for example U.S. Pat. No. 5,952,538, which is herein fully incorporated by reference.

In another embodiment of the processes for converting an oxygenate such as methanol to one or more olefin(s) using a molecular sieve catalyst composition, the WHSV is from 0.01 hr$^{-1}$ to about 100 hr$^{-1}$, at a temperature of from about 350° C. to 550° C., and silica to Me2O3 (Me is a Group III or VIII element from the Periodic Table of Elements) molar ratio of from 300 to 2500. See for example EP-0 642 485 B 1, which is herein fully incorporated by reference.

Other processes for converting an oxygenate such as methanol to one or more olefin(s) using a molecular sieve catalyst composition are described in PCT WO 01/23500 published Apr. 5, 2001 (propane reduction at an average catalyst feedstock exposure of at least 1.0), which is herein incorporated by reference.

The coked molecular sieve catalyst composition is withdrawn from the disengaging vessel, preferably by one or more cyclones(s), and introduced to the regeneration system. The regeneration system comprises a regenerator where the coked catalyst composition is contacted with a regeneration medium, preferably a gas containing oxygen, under general regeneration conditions of temperature, pressure and residence time.

Non-limiting examples of the regeneration medium include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen. The regeneration conditions are those capable of burning coke from the coked catalyst composition, preferably to a level less than 0.5 weight percent baaed on the total weight of the coked molecular sieve catalyst composition entering the regeneration system. The coked molecular sieve catalyst composition withdrawn from the regenerator forms a regenerated molecular sieve catalyst composition.

The regeneration temperature is in the range of from about 200° C. to about 1500° C., preferably from about 300° C. to about 1000° C., more preferably from about 450° C. to about 750° C., and most preferably from about 550° C. to 700° C. The regeneration pressure is in the range of from about 15 psia (103 kPaa) to about 500 psia (3448 kPaa), preferably from about 20 psia (138 kpaa) to about 250 psia (1724 kPaa), more preferably from about 25 psia (172kPaa) to about 150 psia (1034 kPaa), and most preferably from about 30 psia (207 kPaa) to about 60 psia (414 kPaa).

The preferred residence time of the molecular sieve catalyst composition in the regenerator is in the range of from about one minute to several hours, most preferably about one minute to 100 minutes, and the preferred volume of oxygen in the gas is in the range of from about 0.01 mole percent to about 5 mole percent based on the total volume of the gas.

In one embodiment, regeneration promoters, typically metal containing compounds such as platinum, palladium and the like, are added to the regenerator directly, or indirectly, for example with the coked catalyst composition.

Also, in another embodiment, a fresh molecular sieve catalyst composition is added to the regenerator containing a regeneration medium of oxygen and water as described in U.S. Pat. No. 6,245,703, which is herein fully incorporated by reference.

In an embodiment, a portion of the coked molecular sieve catalyst composition from the regenerator is returned directly to the one or more riser reactor(s), or indirectly, by pre-contacting with the feedstock, or contacting with fresh molecular sieve catalyst composition, or contacting with a regenerated molecular sieve catalyst composition or a cooled regenerated molecular sieve catalyst composition described below.

The burning of coke is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated molecular sieve catalyst composition from the regeneration system and passing the regenerated molecular sieve catalyst composition through a catalyst cooler that forms a cooled regenerated molecular sieve catalyst composition. The catalyst cooler, in an embodiment, is a heat exchanger that is located either internal or external to the regeneration system.

In one embodiment, the cooler regenerated molecular sieve catalyst composition is returned to the regenerator in a continuous cycle, alternatively, (see U.S. patent application Ser. No. 09/587,766 filed Jun. 6, 2000) a portion of the cooled regenerated molecular sieve catalyst composition is returned to the regenerator vessel in a continuous cycle, and another portion of the cooled molecular sieve regenerated molecular sieve catalyst composition is returned to the riser reactor(s), directly or indirectly, or a portion of the regenerated molecular sieve catalyst composition or cooled regenerated molecular sieve catalyst composition is contacted with by-products within the gaseous effluent (PCT WO 00/49106 published Aug. 24, 2000), which are all herein fully incorporated by reference. In another embodiment, a regenerated molecular sieve catalyst composition contacted with an alcohol, preferably ethanol, 1-propanol, 1-butanol or mixture thereof, is introduced to the reactor system, as described in U.S. patent application Ser. No. 09/785,122 filed Feb. 16, 2001, which is herein fully incorporated by reference.

Other methods for operating a regeneration system are in disclosed U.S. Pat. No. 6,290,916 (controlling moisture), which is herein fully incorporated by reference.

The regenerated molecular sieve catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the riser reactor(s). In another embodiment, the regenerated molecular sieve catalyst composition withdrawn from the regeneration system is returned to the riser reactor(s) directly, preferably after passing through a catalyst cooler. In one embodiment, a carrier, such as an inert gas, feedstock vapour, steam or the like, semi-continuously or continuously, facilitates the introduction of the regenerated molecular sieve catalyst composition to the reactor system, preferably to the one or more riser reactor(s).

By controlling the flow of the regenerated molecular sieve catalyst composition or cooled regenerated molecular sieve catalyst composition from the regeneration system to the reactor system, the optimum level of coke on the molecular sieve catalyst composition entering the reactor is maintained. There are many techniques for controlling the flow of a molecular sieve catalyst composition described in Michael Louge, Experimental Techniques, Circulating Fluidised Beds, Grace, Avidan and Knowlton, eds. Blackie, 1997 (336–337), which is herein incorporated by reference.

Coke levels on the molecular sieve catalyst composition are measured by withdrawing from the conversion process the molecular sieve catalyst composition at a point in the process and determining its carbon content. Typical levels of coke on the molecular sieve catalyst composition, after regeneration is in the range of from 0.01 weight percent to about 15 weight percent, preferably from about 0.1 weight percent to about 10 weight percent, more preferably from about 0.2 weight percent to about 5 weight percent, and most preferably from about 0.3 weight percent to about 2 weight percent based on the total weight of the molecular sieve and not the total weight of the molecular sieve catalyst composition.

In one preferred embodiment, the mixture of fresh molecular sieve catalyst composition and regenerated molecular sieve catalyst composition and/or cooled regenerated molecular sieve catalyst composition contains in the range of from about 1 to 50 weight percent, preferably from about 2 to 30 weight percent, more preferably from about 2 to about 20 weight percent, and most preferably from about 2 to about 10 coke or carbonaceous deposit based on the total weight of the mixture of molecular sieve catalyst compositions. See for example U.S. Pat. No. 6,023,005, which is herein fully incorporated by reference.

The gaseous effluent is withdrawn from the disengaging system and is passed through a recovery system. There are many well-known recovery systems, techniques and sequences that are useful in separating olefin(s) and purifying olefin(s) from the gaseous effluent. Recovery systems generally comprise one or more or a combination of a various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment for example various condensers, heat exchangers, refrigeration systems or chill trains, compressors, knock-out drums or pots, pumps, and the like.

The metalloaluminophosphate molecular sieve materials and catalyst compositions of the present invention may be used in the manufacture of alkylamines, using ammonia. Examples of suitable processes are as described in published European Patent Application EP 0 993 867 A1, and in U.S. Pat. No. 6,153,798 to Hidaka et.al, which are herein fully incorporated by reference.

When the silicoaluminophosphates are of AEL framework type the preferred processes of the present invention include hydrocarbon isomerization, hydrotreating, and cracking such as hydrocracking and fluid catalytic cracking, especially naphtha cracking. More specifically, the silicoaluminophosphates of AEL framework type according to the present invention may be used in applications including, but not limited to, catalytic dewaxing, isodewaxing/isomerization, hydrocracking, alkylation of aromatic hydrocarbons (e.g., benzene) with long chain olefins (e.g., C14 olefin), alkylation of aromatic hydrocarbons (e.g., benzene and alkylbenzenes) in the presence of an alkylating agent (e.g., olefins, formaldehyde, alkyl halides and alcohols having 1 to about 20 carbon atoms), alkylation of aromatic hydrocarbons (e.g., benzene) with light olefins to produce short chain aromatic compounds (e.g., alkylation of benzene with propylene to give cumene), transalkylation of aromatic hydrocarbons in the presence of polyalkylaromatic hydrocarbons, isomerization of aromatic feedstock components (e.g., xylene), naphtha cracking to make olefins, oligomerization of straight and branched chain olefins having from about 2 to 5 carbon atoms, disproportionation of aromatics (e.g., the disproportionation of toluene to make benzene and paraxylene), and conversion of naphtha and similar mixtures to highly aromatic mixtures.

In order to provide a better understanding of the present invention including representative advantages thereof, the following examples are offered.

EXAMPLES

XRD

X-ray Powder Diffractograms were recorded on Siemens D500 diffractometer with voltage of 40 kV and current of 30 mA, using a Cu target and Ni-filter ($\lambda$=0.154 nm). Elemental analysis of Al, Si, and P was performed using the Inductively Coupled Plasma (ICP) spectroscopy. Unless specified otherwise, all amounts and parts are expressed by weight.

Example 1

Preparation of [Si—Al—P]-AEL (SAPO-11) using N,N-dimethylbutylamine (DMBA) as template The following ingredients are mixed, in sequence, and blended into a uniform gel using a microhomogenizer (Tissue Tearor Model 98730 available from Biospec Products Inc, USA): 7.04 g 85 wt % $H_3PO_4$ (obtained from Aldrich Chemical Company), 13.4 g $H_2O$, 0.53 g Cabosil ™ (available from Cabot Corporation, Illinois, USA), 3.66 g Catapal™ A (71.5 wt % $Al_2O_3$, available from CONDEA Vista Company, Texas, USA), and then 5.3 g of N,N-dimethylbutylamine (DMBA) (obtained from Aldrich Chemical Company, USA). The molar ratio of the ingredients is as follows:

$$2.0\ DMBA:1.0Al_2O_3:0.3\ SiO_2:1.15P_2O_5:34H_2O$$

The gel was then divided into two equal parts and placed into a Parr bomb with Teflon liner, and heated to 170° C. for 10 days with no agitation. The solid product was centrifuged and washed several times with deionized water until the conductivity of the supernatant was below 50 mS/cm, and was then dried in a 60° C. vacuum oven overnight to provide a silicoaluminophosphate of the AEL framework type, comprising N,N-dimethylbutylamine within its intra-crystalline structure. X-ray powder patterns of the product confirmed that the product is a silicoaluminophosphate of the AEL framework type. The solid product yield is 15.0% after 3 days of crystallization, based on the weight of the starting synthesis mixture, Elemental analysis of the products gives: Al, 19.7%; P, 21.6%; Si,1.58% which corresponds to a molar composition $Al_{1.0}Si_{0.077}P_{0.955}$.

This example shows that relatively pure silicoaluminophosphates of the AEL framework type may be synthesized with N,N-dimethylbutylamine as template.

Example 2

Preparation of [Si—Al—P]-AEL (SAPO-11) using N,N-dimethylbutylamine (DMBA) as template The procedure of Example 1 was repeated to prepare 175 g of gel. Mixing in this case was achieved using a simple blender. The gel was then transferred to a stainless steel autoclave equipped with a stirrer and was sealed before being heated to 170° C. for 40 hours during which the gel was stirred at 240 rpm. The solid product was centrifuged and washed several times with deionized water until the conductivity of the supernatant was below 50 mS/cm, and was then dried in a 60° C. vacuum oven overnight to provide a silicoaluminophosphate of the AEL framework type, comprising N,N-dimethylbutylamine within its intra-crystalline structure. X-ray powder patterns of the product confirmed that the product is a silicoaluminophosphate of the AEL framework type The solid product yield is 20.9% after 3 days of crystallization, based on the weight of the starting synthesis mixture. Elemental analysis of the products gives: Al, 18.4%; P, 20.7%; Si,2.06% which corresponds to a molar composition $Al_{1.0}Si_{0.108}P_{0.950}$.

Figure 1:
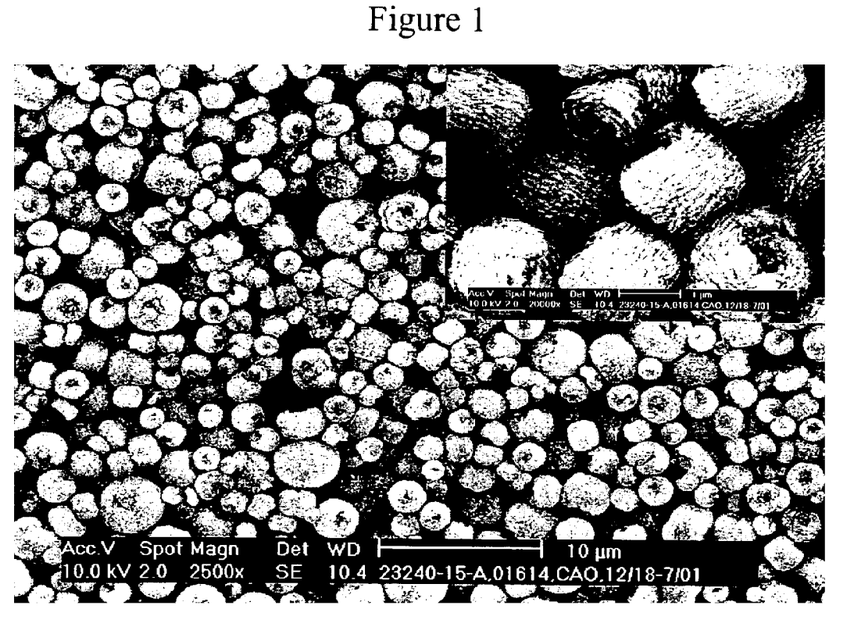
FIG. 1 shows the Scanning Electron Micrograph of a crystalline silicoaluminophosphate molecular sieve of AEL framework type prepared using N,N-dimethylbutylamine as organic template.
Figure 2:
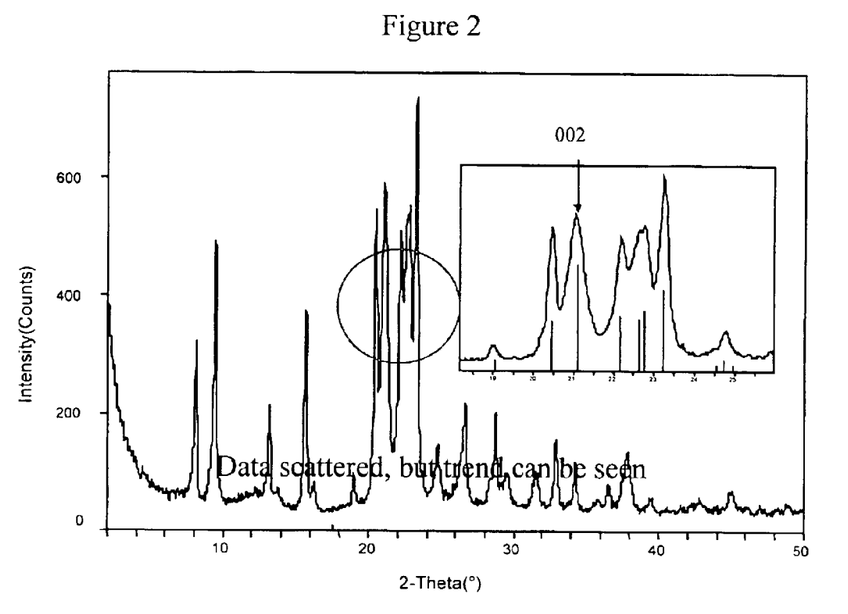
FIG. 2 shows the XRD pattern of a crystalline silicoaluminophosphate molecular sieve of AEL framework type prepared using N,N-dimethylbutylamine as organic template.

A Scanning Electron Micrograph of this product is shown in FIG. 1. This shows that the product is composed of 2 to 5 μm "dimpled" spheres which are further composed of thin (about 50 nm) platelets. The thin platelet morphology is also reflected in the broadening of the 002 reflection in the XRD pattern for this material as illustrated in FIG. 2. This Example illustrates that the process of the present invention is capable of producing [Si—Al—P]-AEL (SAPO-11) of the highly desirable platelet morphology without the use of surfactants and/or crystal modifiers in the synthesis.

Example 3

Preparation of [Si—Al—P]-AEL (SAPO-11) using N,N-dimethylbutylamine (DMBA) as template A gel was prepared according to the method of Example 1. The molar ratio of the ingredients in the gel was as follows:

2.0 DMBA:1.0 $Al_2O_3$:0.3 $SiO_2$:1.0 $P_2O_5$:34 $H_2O$

The gel was then divided into two equal parts and placed into a Parr bomb with Teflon liner, and heated to 150° C. for 40 and 72 hours whilst being tumbled. The solid product was isolated in the same manner as Example 1. The solid product yields were 7.3 and 7.9% respectively, based on the weight of gel. XRD analysis showed that the products were pure crystalline SAPO-11 with a similar 002 broadening as observed with Example 2 indicating platelet morphology.

This example shows that pure silicoaluminophosphates of the AEL framework type may be synthesized with N,N-dimethylbutylamine as template at low temperatures.

Example 4

Preparation of [Si—Al—P]-CHA (SAPO-34) using N,N-dimethylbutylamine (DMBA) as template A gel was prepared according to the method of Example 1 to make 30 g of gel. The molar ratio of the ingredients in the gel was as follows:

3.0 DMBA:1.0 $Al_2O_3$:0.3 $SiO_2$:1.15 $P_2O_5$:34 $H_2O$

Figure 3:
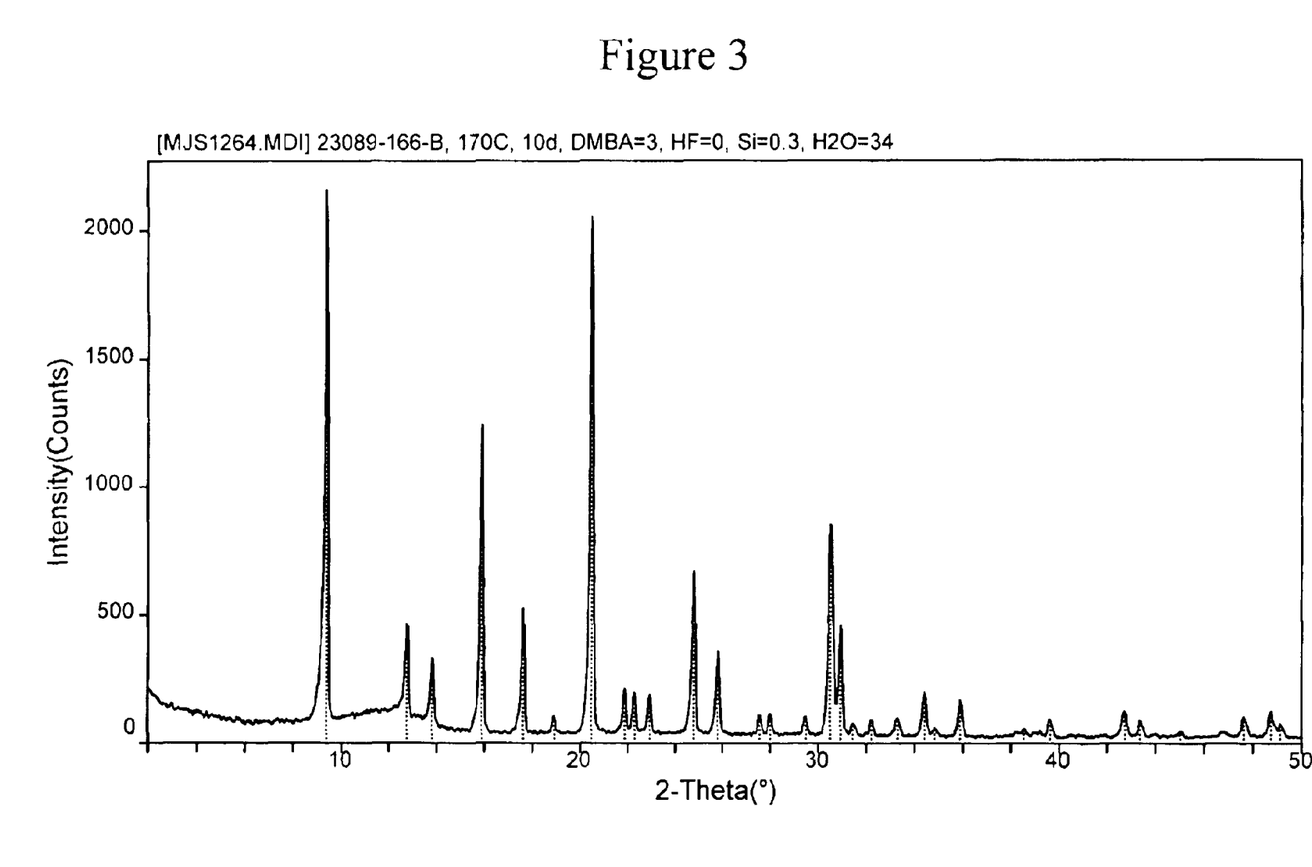
FIG. 3 shows the XRD pattern of a crystalline silicoaluminophosphate molecular sieve of CHA framework type prepared using N,N-dimethylbutylamine as organic template.

The gel was then divided into two equal parts and placed into a Parr bomb with Teflon liner, and heated to 150° C. for 7 and 10 days with no agitation. The solid product was isolated in the same manner as Example 1. The solid product yields were 6.4 and 5.7% respectively, based on the weight of gel. XRD analysis showed that the products were pure crystalline SAPO-34; the XRD pattern is illustrated in FIG. 3.

Example 5

Preparation of [Si—Al—P]-CHA (SAPO-34) using N,N-dimethylbutylamine (DMBA) as template Example 4 was repeated with a gel of the following composition:

4.0 DMBA:1.0 $Al_2O_3$:0.3 $SiO_2$:1.0 $P_2O_5$:34 $H_2O$

The resultant product was a pure silicoaluminophosphate of the CHA framework type.

What is claimed is:

1. A process for preparing a crystalline silicoaluminophosphate molecular sieve of the AEL framework type, which process comprises; forming a reaction mixture comprising a source of alumina, a source of phosphate, a source of silica and at least one organic template which comprises one or more tertiary amines of the general formula (I):

(R)(R')(N)—($C_4H_9$)     (I)

wherein R and R', which may be the same or different groups, are substituted or un-substituted aliphatic or cycloaliphatic groups, except butyl groups, inducing crystallization of crystalline molecular sieve, and recovering the crystalline molecular sieve.

2. The process of claim 1, wherein the molar ratio of organic template to $Al_2O_3$ in the synthesis mixture is less than 3.

3. A process as claimed in claim 1 wherein the one or more tertiary amines have the general formula (I):

(R)(R')N—($C_4H_9$)     (I)

wherein R and R' contain from 1 to 3 or 5 to 12 carbon atoms.

4. A process as claimed in claim 3, wherein R and R' are linear alkyl groups, but not butyl groups.

5. A process as claimed in claim 3, wherein R and R' contain a branched alkyl group but not butyl groups.

6. A process as claimed in claim 3, wherein R and R' are independently one of the following alkyl moieties: methyl, ethyl, n-propyl, iso-propyl, n-pentyl, iso-pentyl, n-hexyl, iso-hexyl, heptyl, iso-heptyl, n-octyl, iso-octyl, n-decyl, iso-decyl, n-undecyl, iso-undecyl, n-dodecyl and iso-dodecyl.

7. A process as claimed in claim 3, wherein R and R' are independently methyl, ethyl and propyl.

8. A process as claimed in claim 3, wherein R and R' are methyl.

9. A process for preparing a crystalline silicoaluminophosphate molecular sieve, which process comprises; forming a reaction mixture comprising a source of alumina, a source of phosphate, a source of silica and at least one organic template which comprises one or more tertiary amines of the general formula (I):

(R)(R')(N)—($C_4H_9$)     (I)

wherein R and R', which may be the same or different groups, except butyl group; are selected from the group consisting of substituted or un-substituted cycloaliphatic groups, linear or branched alcohol groups, and liner or branched amine-containing groups, inducing crystallization of crystalline molecular sieve, and recovering the crystalline molecular sieve.

10. A process as claimed in claim 9, wherein R and R' are cycloaliphatic groups.

11. A process as claimed in claim 9, wherein R and R' are linear or branched alcohol groups, or linear or branched amine-containing groups.

12. A process as claimed in claim 1 or claim 9, further comprising the step of calcining the crystalline molecular sieve.

13. A process as claimed in claim 1 or claim 9, wherein the —$C_4H_9$ group in formula (I) is n-butyl.

14. A process according to claim 1 or claim 9, wherein the molar ratio of $P_2O_5/Al_2O_3$ ratio in the synthesis mixture is within the range of 0.8 to 1.3.

15. A silicoaluminophosphate molecular sieve, substantially of AEL framework type, comprising within its intracrystalline structure at least one template which contains one or more tertiary amines having the general formula (I):

(R)(R')N—($C_4H_9$)     (I)

wherein R and R', which may be the same or different groups, are substituted or un-substituted aliphatic or cycloaliphatic groups, except butyl groups.

16. The silicoaluminophosphate molecular sieve of claim 15, wherein the tertiary amine is N,N-dimethylbutylamine.

17. The silicoaluminophosphate molecular sieve of claim 16, wherein the molecular sieve is SAPO-11.

18. The silicoaluminophosphate molecular sieve of claim 15, having a platelet morphology.

19. A method for the manufacture of a formulated catalyst composition, which method comprises forming a mixture comprising at least one silicoaluminophosphate molecular sieve according to claim 15 with at least one formulating agent, to form a catalyst composition.

20. A formulated molecular sieve composition comprising at least one silicoaluminophosphate molecular sieve according to claim 15 in admixture with at least one formulating agent.

* * * * *